Patented Oct. 16, 1928.

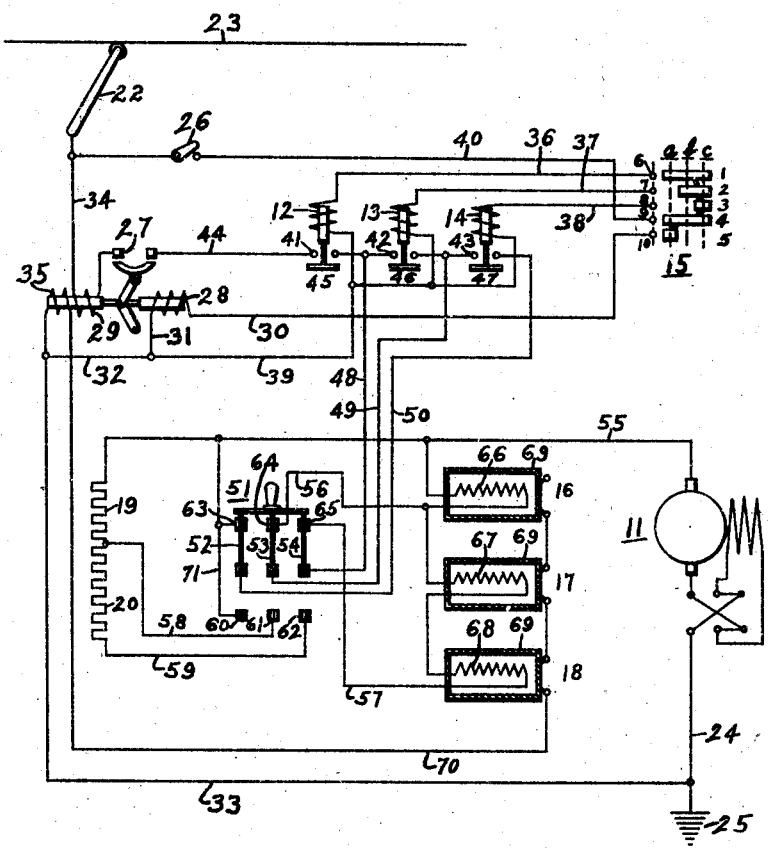

1,687,652

UNITED STATES PATENT OFFICE.

BASCUM O. AUSTIN, OF EAST PITTSBURGH, PENNSYLVANIA, ASSIGNOR TO WESTINGHOUSE ELECTRIC & MANUFACTURING COMPANY, A CORPORATION OF PENNSYLVANIA.

ELECTRIC HEATING SYSTEM FOR CARS.

Application filed August 9, 1927. Serial No. 211,685.

My invention relates to electric heating systems for cars and more particularly to heating systems in which the heaters may be utilized as resistors for controlling the current supply to the car-propelling motors.

It is common practice to install the grids or resistors utilized for controlling the operation of the propelling motors of an electric car under the car. In such cases, a considerable amount of energy is dissipated in the form of heat given off to the atmosphere by the resistors.

In some electric cars, provision has been made for utilizing the car heaters as resistors for controlling the propelling motors. This latter scheme may be adopted only when the atmospheric temperatures are comparatively low.

However, when the car heaters are utilized as motor resistors, provision should be made for protecting the system in case a short-circuit occurs in one of the heaters. The occurrence of a short-circuit in a heater, if continued any considerable length of time, may be dangerous to the occupants of the car and may result in the burning of the car.

It is an object of the invention to provide for grounding the heaters and interrupting the motor circuit upon the occurrence of a short circuit between the heater resistors and their casings or supports.

It is also an object of my invention to provide a system of the above indicated character that shall be simple to install and efficient in operation.

Other objects of the invention will, in part, be obvious and will, in part, appear hereinafter.

The invention, accordingly, is disclosed in the embodiment thereof shown in the accompanying drawing and comprises the structural features, the combination of elements and arrangement of parts which will be exemplified in the construction hereinafter set forth, and the scope of the application of which will be indicated in the claims.

For a fuller understanding of the invention, reference may be had to the following detailed description, taken in connection with the accompanying drawing, the single figure of which is a diagrammatic view of the apparatus and circuit connections of an electric-car-heating system constructed in accordance with the invention.

The system illustrated in the drawing comprises a series-wound motor 11 for propelling the car, a plurality of resistors disposed to be connected in circuit with the motor, relays 12, 13 and 14 for changing the arrangement of the resistors in the motor circuit and a master controller 15 for controlling the operation of the relays 12 to 14, inclusive.

A manually operable switch 26 is disposed in the circuit between the trolley 22 and the master controller 15 for connecting the motor circuit to or disconnecting it from the source of electrical energy. It will be understood that the switch 26 will be closed when it is desired to put the car into operation and that it will remain closed until the vehicle is returned to the car shed or some other place for parking.

In order to protect the motor 11, an overload coil disposed to actuate the line switch 27 is connected in the motor circuit. The line switch 27 is also provided with a setting coil 28 and a holding coil 29. The setting coil 28 is connected in circuit with the master controller 15 through conductor 30 and to the ground 25 through conductors 31, 32 and 33. The holding coil 29 is connected in series with the conductor 34 extending from the trolley to the line switch 27. The line switch 27 is also provided with a tripping coil 35, for a purpose that will be hereinafter set forth.

The master controller 15 is indicated as embodying a set of electrically connected contact segments 1, 2, 3, 4 and 5 that are disposed to engage a set of control fingers 6, 7, 8, 9 and 10. The control fingers 6, 7 and 8 are respectively connected, through conductors 36, 37 and 38, to the operating relays 12, 13 and 14 and from thence to the ground 25 through conductors 39, 32 and 33. The control finger 9 is connected to the trolley 22 through conductor 40, and the control finger 10 is connected to the setting coil 28 on the line switch 27 through conductor 30.

The stationary contact members 41, 42 and 43 of the operating relays 12, 13 and 14 are connected to the trolley 22 through conductor 44, line switch 27 and conductor 34, and their movable contact members 45, 46 and 47 are connected, through conductors 48, 49 and 50, to a manually-operated double-throw switch 51 that is employed to connect the resistance devices 16, 17, 18, 19 and 20 in the motor circuit.

The double-throw switch 51 is provided with three blades 52, 53 and 54 and is connected to the motor through conductor 55 and to the resistors through conductors 56, 57, 58 and 59.

It will be noted that the resistors which are connected in the motor circuit by means of the double-throw switch 51 are divided into two sets of substantially equal ohmic value. The resistors 19 and 20, forming one set, are connected to switch jaws 60, 61 and 62, and the resistors 16, 17 and 18, forming the other set, are connected to switch jaws 63, 64 and 65 in order that either set may be connected in the motor circuit by moving the double-throw switch to the proper position.

The resistors 19 and 20 may be of the well-known grid form and are designed to be mounted in any desired position outside of the car body, preferably underneath the car. The resistance devices or heaters 16, 17 and 18 are designed to be located within the car in order that they may also act as heaters for the car when serving to regulate the current supply to the motor.

Inasmuch as the resistance devices 16, 17 and 18 are mounted in the car and are connected in circuit with the motor during certain periods, they introduce a certain hazard by reason of the possibility of subjecting to electric shocks or otherwise injuring the occupants of the car upon the occurrence of short circuits in the resistors 66, 67 and 68. Therefore, each of the resistors 66, 67 and 68 has been provided with a protective casing 69 and each casing is connected in a grounding circuit through a conductor 70. As an additional safeguard, the grounding circuit is connected to the tripping coil 35 in the line switch 27 in such manner that the line switch will be opened when current traverses the grounding circuit.

Assuming now that the switch 26 is closed, and that the switch 51 is thrown to its upper position, to utilize the resistors 16, 17 and 18 to control the current supply to the motor, and that the master controller 15 is actuated to its initial operative position $a$, then an energizing circuit for the line switch actuating coil 28 is established which extends from the trolley 23, through trolley pole 22, switch 26, conductor 40, control fingers 9 and 10, bridged by contact segments 4 and 5, conductor 30, the switch-actuating coil 28, conductors 32 and 33 to the ground 25, and the line switch is closed.

An energizing circuit for the relay 12 is also established and it may be traced as extending from the energized contact segment 1, through the finger 6, conductor 36, the actuating coil of relay 12, conductors 39, 32 and 33 to the ground 25.

The closing of the relay 12 completes the motor circuit which extends from the trolley 22, through conductor 34, holding coil 29, line switch 27, conductor 44, the contact members 41 and 45 of the operating relay 12, conductor 48, blade 54 of the double-throw switch, conductor 57, the resistors 68, 67 and 66, the resistors of the resistance devices, conductor 55, the motor 11 and conductor 24 to ground 25.

A movement of the master controller 15 to position $b$ effects engagement of the contact segment 2 with the control finger 7 and establishes an actuating circuit for the operating relay 13, which, when closed, connects the resistors 16, 17 and 18 in parallel relation, to secure a predetermined degree of acceleration of the motor. When the relay 13 is closed a circuit is established from the energized conductor 44 through the relays 12 and 13, conductor 49, switch 51, conductor 56 and the resistor 66 to the conductor 55. Therefore, the circuits through the resistors 66 to 68, inclusive, permit an increase in the current supplied to the motor.

From the foregoing, it will be readily understood that the motor may be accelerated step-by-step as the master controller is operated.

During warm weather, when the heaters 16, 17 and 18 are not needed to heat the car, the grid resistors 19 and 20 may be substituted therefor by actuating the double-throw switch from the position indicated in the drawings to its opposite position where it will connect with the switch jaws 60, 61 and 62. When the double-throw switch is connected to the grid resistances 19 and 20, if the master controller is moved to position $a$, the operating relay 12 will be actuated and all of the grid resistances 19 and 20 will be included in the motor circuit. Under such conditions, the motor circuit will extend from conductor 48, through switch blade 54, switch jaw 62, conductor 59, resistances 20 and 19, conductor 55, motor 11 and conductor 24 to ground.

When the controller is advanced to position $b$, the operating relay 13 will be actuated and the grid resistances 19 and 20 will be placed in parallel by the completion of an additional circuit from conductor 49 and switch blade 53 through switch jaw 61, conductor 58, resistance 19 to conductor 55.

If the controller is advanced to position $c$, the operating relay 14 will be actuated, the grid resistances 19 and 20 will be short-circuited and the motor 11 will be connected to run at full speed, by the completion of a circuit through conductor 50, switch blade 52, switch jaw 60, conductors 71 and 55, motor 11 and conductor 24 to ground.

When the heaters are connected in the motor circuit, if one of the resistors comes into engagement with a casing 69, an energizing circuit for the trip coil 35 is established which extends from the energized resistor through the casing 69, conductor 70, the trip coil 35 on the line switch and conductor 33 to ground at 25. The line switch is opened, interrupting the motor and heater circuit.

While the illustrated example constitutes a particular embodiment of my invention, I do not limit myself strictly to the details shown, since, manifestly, the same may be varied considerably without departing from the spirit of the invention as defined in the appended claims.

I claim as my invention:

1. In an electric-car-heating system, the combination with an electric motor for propelling the car, a motor circuit for supplying current to the motor, a line switch for the motor circuit, a resistor disposed outside the car, an electric heater disposed within the car, a switch for connecting either the heater or the resistor in the motor circuit, of a casing for the heater, a grounding circuit for the casing, and means responsive to current traversing the grounding circuit for opening the line switch.

2. In an electric-car-heating system, the combination with an electric motor for propelling the car, a motor circuit for supplying current to the motor, a line switch for the motor circuit, a resistor disposed outside the car, an electric heater disposed within the car, a switch for connecting either the heater or the resistor in the motor circuit, of a casing for the heater, a grounding circuit for the casing, and means connected in the grounding circuit for opening the line switch when current traverses the grounding circuit.

3. In an electric-car-heating system, the combination with an electric motor for propelling the car, a motor circuit for supplying current to the motor, a line switch for the motor circuit, a resistor disposed outside the car, an electric heater disposed within the car, a switch for connecting either the heater or the resistor in the motor circuit, of a casing for the heater, a grounding circuit for the casing, and a tripping coil for said line switch connected in the grounding circuit.

4. In an electric-car-heating system, the combination with an electric motor for propelling the car, a motor circuit for supplying current to the motor, and an electric heater disposed within the car, of a casing for the heater, a grounding circuit for the casing, and means responsive to current traversing the grounding circuit for opening the line switch.

5. In an electric-car-heating system, the combination with an electric motor for propelling the car, a motor circuit for supplying current to the motor, and an electric heater disposed within the car, of a conducting casing for the heater, a grounding circuit for the casing, and means responsive to current traversing the grounding circuit for opening the line switch.

6. In a car-heating system, in combination, a motor, means for connecting the motor to a power source, heater resistors disposed to be connected in circuit with the motor, and means responsive to a grounding of a resistor to interrupt the motor circuit.

In testimony whereof, I have hereunto subscribed my name this 3rd day of August, 1927.

BASCUM O. AUSTIN.